May 31, 1966   A. T. DOUGLASS   3,253,964
CORROSION INHIBITORS
Filed April 22, 1957
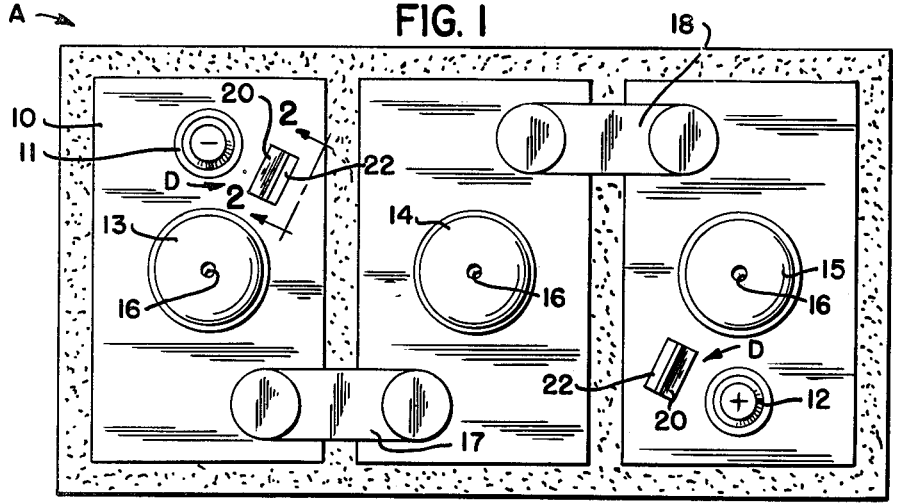
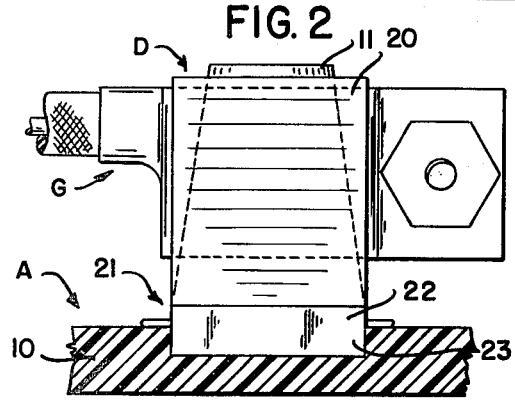
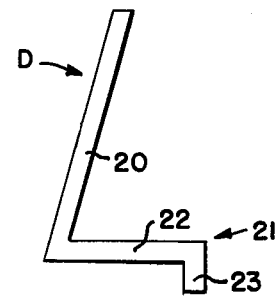
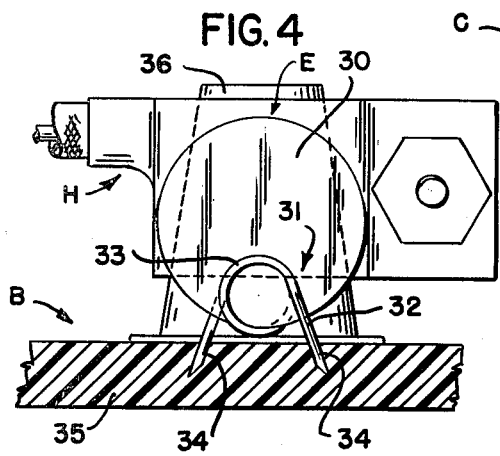
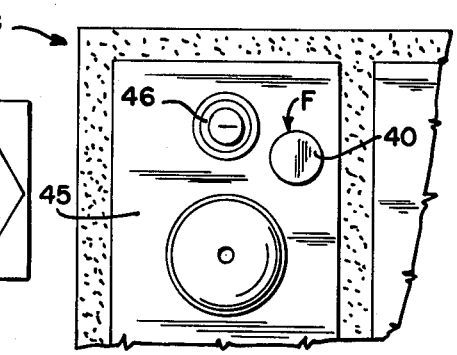
INVENTOR
Albert T. Douglass
BY *Lancaster, Allwine & Rommel*
ATTORNEYS United States Patent Office 3,253,964
Patented May 31, 1966

3,253,964
CORROSION INHIBITORS
Albert T. Douglass, 742 Clemont Drive NE.,
Atlanta, Ga.
Filed Apr. 22, 1957, Ser. No. 654,406
1 Claim. (Cl. 136—181)

This invention relates to corrosion inhibitors. More specifically it relates to corrosion inhibitors, composed of metal, for use with storage batteries containing corrosive electrolytes.

Another important object of the invention is to provide corrosion inhibitors of metal adapted to be disposed adjacent the posts of charged storage batteries containing corrosive electrolyte, such as of sulphuric acid, which inhibitors, when disposed adjacent the battery posts of the storage batteries will tend to become corroded instead of the battery posts.

Another important object is to provide corrosion inhibitors of metal adapted to be disposed adjacent the attached terminals of battery cables extending to the posts of storage batteries containing corrosive electrolyte, such as sulphuric acid.

Other objects and advantages of the invention will be apparent during the course of the following detailed description of the invention, taken in connection with the accompanying drawing, forming a portion of this disclosure, and in which drawing:

FIG. 1 is a top plan of a conventional storage battery with two corrosion inhibitors in place adjacent two battery posts.

FIG. 2 is a fragmentary vertical sectional view, on an enlarged scale, substantially on the line 2—2 of FIG. 1 showing one form of the corrosion inhibitors in face elevation and a fragment of an electrical conductor terminal connected with the battery post.

FIG. 3 is a vertical side or edge view of the corrosion inhibitor of FIG. 2 removed from a battery.

FIG. 4 is a fragmentary vertical sectional view, of a storage battery with another form of the corrosion inhibitor in position.

FIG. 5 is a fragmentary top plan of a storage battery with one of the inhibitors disposed flat thereon.

In the drawing, wherein for the purpose of illustration are shown three forms of the corrosion inhibitor, the letters A, B and C respectively designate three storage batteries; D, E and F designate three forms of the corrosion inhibitor and G and H electrical conductor terminals.

The storage battery A of FIGS. 1 and 2 is of conventional construction and includes a cover 10, provided with spaced-apart openings from which project conventional lead battery posts 11 and 12, one being the positive post of one positive plate assembly (not shown) of one cell and the other the negative post of one negative plate assembly of another cell. The posts 11 and 12 are disposed adjacent opposite corners of the cover 10 and there are also shown filler caps 13, 14 and 15, one for each cell of the battery, each cap being provided with a vent 16. Suitable cell connectors 17 and 18 are shown, one connecting the negative post of the first cell with the positive post of the middle cell and the other connecting the negative post of the middle cell with the positive post of the third cell. Generally, the battery posts are of lead and the electrolyte (not shown) is of sulphuric acid mixed with water. Such electrolyte gives off fumes and the electrolyte and fumes are corrosive to most metals.

The corrosion inhibitor D is shown as a polygonal plate having an upwardly-extending body portion 20 and from preferably the lower end thereof extends means 21 to attach the body portion, in an upright position, to a support, as the battery cover 10. In the example shown, the means 21 may comprise a base or bracket portion 22 extending outwardly from the lower end of the body portion 20 and a downwardly-extending prong or lug portion 23 at the outer end of the bracket portion 22 for extension into the material of the battery cover 10, with the bottom face of the bracket portion extending, in face-to-face relation, over the upper face of the battery cover 10. A preferred size of corrosion inhibitor D, with reference to a conventional battery post is shown in FIGURE 2 but the size of the inhibitor may be varied within reasonable limits and the body portion need not be higher than wider, nor have an upper edge strictly normal to the side edges. What is essential is that the material of the body portion 20 be more subject to corrosion than is the lead of such battery posts (such metals being, for example, copper or bronze) and that the corrosion inhibitors be placed closely adjacent but spaced from the battery posts 11 and 12 and facing one another. I prefer to form the body portion 20, base or bracket portion 22 and prong or lug portion 23 integral.

Referring now to FIGURE 4, I may provide the corrosion inhibitor E, which comprises a body portion 30 and means 31 to attach the body portion 30 to a support, as the battery cover 35 of a storage battery B through which cover extends battery posts substantially like the post 36, which may be like the storage battery A.

The body portion 30 is shown as a disk but may be of other shapes as a flat plate with a plurality of edges, such as the body portion 20. It should be metal similar to that of the body portion 20.

The means 31 comprises a base or bracket portion 32 formed of a single length of wire formed, as by being bent, at its intermediate part, into a double loop 33, with the loop convolutions spaced apart and facing one another, and the free ends 34 of the wire length providing prong or lug portions 35 for extending into a battery cover. Of course an edge part of the body portion 30 is slipped between the loop convolutions to be gripped thereby.

The corrosion inhibitors E must be disposed as are the inhibitors D, i.e., closely adjacent the lead parts and facing one another.

I have discovered that the corrosion inhibitors need not be placed with their body portions in upwardly-extending positions but they must be spaced from their associated lead posts and be substantially bisected by an imaginary line extending from the axial center of each post, such as the posts 11 and 12 of opposite polarity. For example the corrosion inhibitor F of FIGURE 5 may have a body portion 40 in the form of a disk, disposed flat upon the battery cover 45 through which cover extends the post 46. While the corrosion inhibitors F need not be disk-shaped, and may have a plurality of edges, like the body portion 20, by way of example, it must be of metal similar to that of the body portions 20 and 30, as for example, copper or bronze, and be spaced closely adjacent the battery posts and in line with the posts at the opposite corners of the battery, as are the inhibitors D and E.

I do not know why corrosive action occurs on the corrosion inhibitors D, E and F rather than on the associated battery posts and conductor terminals, such as the terminals G and H, but I have discovered that it does when the battery is properly operated, and the inhibitors are disposed as described. While electrolyte fumes attack the corrosion inhibitors it may be that stray electric currents contribute to the corrosive action upon the inhibitors rather than upon the posts and terminals.

By the term "charged" in the claim is meant charged in an electrical sense.

Various changes may be made to the forms of the invention herein shown and described without departing from the spirit of the invention or scope of the claim.

What is claimed is:

An anti-corrode device for a wet sulphuric acid electrolyte, lead terminal type battery comprising, a vertically disposed sheet of bimetallic material having at least one metal more electrochemically active than the lead terminals of said battery having a series of downwardly extending mounting feet adapted to be driven in the soft tar between the battery case and cells so as to react with corrosive electrolyte liquids escaping from said terminals and the filler caps of the battery.

References Cited by the Examiner

UNITED STATES PATENTS

| | | | |
|---|---|---|---|
| 2,486,802 | 11/1949 | Selke | 85—11 |
| 2,784,245 | 3/1957 | Coleman et al. | 136—181 |
| 2,956,101 | 10/1960 | Buhl | 136—181 |

WINSTON A. DOUGLAS, *Primary Examiner.*

JOHN R. SPECK, *Examiner.*

JOHN H. MACK, R. E. JONES, S. PARKER, D. L. WALTON, *Assistant Examiners.*